US012626990B2

(12) United States Patent
Lombardi et al.

(10) Patent No.: US 12,626,990 B2
(45) Date of Patent: May 12, 2026

(54) BATTERY CHASSIS FOR ELECTRONIC DEVICES

(71) Applicant: Google LLC, Mountain View, CA (US)

(72) Inventors: Michael J. Lombardi, South Barrington, IL (US); Joseph Allore, Mundelein, IL (US); Tyler Jon Ewing, Menlo Park, CA (US); Adam Joseph Brinkman, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 81 days.

(21) Appl. No.: 18/778,389

(22) Filed: Jul. 19, 2024

(65) Prior Publication Data

US 2024/0380050 A1     Nov. 14, 2024

Related U.S. Application Data

(60) Provisional application No. 63/665,006, filed on Jun. 27, 2024.

(51) Int. Cl.
| | |
|---|---|
| *H02J 50/00* | (2016.01) |
| *G06F 1/188* | (2026.01) |
| *H01M 10/655* | (2014.01) |
| *H01M 50/202* | (2021.01) |
| *H01M 50/242* | (2021.01) |

(Continued)

(52) U.S. Cl.
CPC .......... *H01M 50/244* (2021.01); *G06F 1/188* (2013.01); *H01M 10/655* (2015.04); *H01M 50/202* (2021.01); *H01M 50/242* (2021.01); *H01M 50/247* (2021.01); *H01M 50/262* (2021.01); *H02J 50/005* (2020.01); *H01M 2220/30* (2013.01)

(58) Field of Classification Search
None
See application file for complete search history.

(56) References Cited

U.S. PATENT DOCUMENTS

| | | | | | |
|---|---|---|---|---|---|
| 5,959,433 | A | * | 9/1999 | Rohde | H02J 7/0029 |
| | | | | | 320/108 |
| 6,016,046 | A | * | 1/2000 | Kaite | H02J 50/005 |
| | | | | | 320/108 |

(Continued)

FOREIGN PATENT DOCUMENTS

| | | |
|---|---|---|
| CN | 214378578 U | 10/2021 |
| CN | 218416445 U | 1/2023 |
| CN | 219304863 U | 7/2023 |

OTHER PUBLICATIONS

"GE Engineering Thermoplastics Design Guide Design", Retrieved at: https://www.controlplastics.com/technical-resources/GEP_Design_Guide.pdf—on Mar. 26, 2024, 292 pages.

*Primary Examiner* — Xanthia C Relford
(74) *Attorney, Agent, or Firm* — Colby Nipper PLLC

(57) ABSTRACT

This document describes systems and techniques directed at a battery chassis for electronic devices. In aspects, a battery is attached to a battery chassis that mechanically interlocks with a mechanical frame of an electronic device. The battery chassis includes a plurality of shear stops that constrain a motion of the battery chassis and battery subassembly in at least two dimensions. The battery chassis and battery subassembly can be removed from the electronic device without severing an adhesive, facilitating device repair.

13 Claims, 9 Drawing Sheets

Section View A-A

(51) Int. Cl.

| | |
|---|---|
| *H01M 50/244* | (2021.01) |
| *H01M 50/247* | (2021.01) |
| *H01M 50/262* | (2021.01) |

(56) References Cited

U.S. PATENT DOCUMENTS

| | | | | | |
|---|---|---|---|---|---|
| 7,683,572 | B2 * | 3/2010 | Toya | ..................... | H02J 50/12 |
| | | | | | 320/108 |
| 8,115,447 | B2 * | 2/2012 | Toya | ..................... | H02J 50/10 |
| | | | | | 320/108 |
| 8,248,025 | B2 * | 8/2012 | Sip | ..................... | H02J 7/0042 |
| | | | | | 320/108 |
| 8,436,576 | B2 * | 5/2013 | Toya | ................. | H01M 50/262 |
| | | | | | 320/108 |
| 9,172,268 | B2 * | 10/2015 | Chang | ................... | H02J 50/90 |
| 11,258,309 | B2 * | 2/2022 | Hwang | ................. | H05K 5/03 |
| 2002/0155345 | A1 | 10/2002 | Maple | | |
| 2013/0038278 | A1 * | 2/2013 | Park | ..................... | H02J 50/10 |
| | | | | | 320/108 |
| 2026/0006115 | A1 | 1/2026 | Lombardi et al. | | |

* cited by examiner

Battery Chassis 302

Shear Stop 504

Battery Chassis 302

Shear Stop 502

500

Electronic
Device
102

Display
106

Mechanical
Frame
202

See FIG. 7

Housing
Panel
206

Recess
602

Wireless-Charging
Coil 112

Battery
110

Battery Chassis
302

Exploded View

600

BATTERY CHASSIS FOR ELECTRONIC DEVICES

CROSS-REFERENCE TO RELATED APPLICATION(S)

This application claims the benefit of U.S. Provisional Patent Application Ser. No. 63/665,006, filed on Jun. 27, 2024, the disclosure of which is incorporated by reference herein in its entirety.

SUMMARY

This document describes systems and techniques directed at a battery chassis for electronic devices. In aspects, a battery is attached to a battery chassis that mechanically interlocks with a mechanical frame of an electronic device. The battery chassis includes a plurality of shear stops that constrain a motion of the battery chassis and battery subassembly in at least two dimensions. The battery chassis and battery subassembly can be removed from the electronic device without severing an adhesive, facilitating device repair.

In implementations, an electronic device is disclosed that includes an outer enclosure having a mechanical frame and one or more housing panels. The electronic device also includes a display that is attached to the outer enclosure. The outer enclosure and the display, when attached, define an internal cavity. The electronic device further includes a battery disposed within the internal cavity. The electronic device also includes a battery chassis on which the battery is attached. The battery chassis includes a plurality of shear stops that mechanically interlock with the mechanical frame. The plurality of shear stops are configured to constrain a movement of the battery chassis in at least two dimensions.

This Summary is provided to introduce simplified concepts of systems and techniques directed at a battery chassis for electronic devices, the concepts of which are further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of systems and techniques directed at a battery chassis for electronic devices are described in this document with reference to the following drawings.

The same numbers are used throughout the Drawings to reference like features and components.

DETAILED DESCRIPTION

Overview

Figure 1:
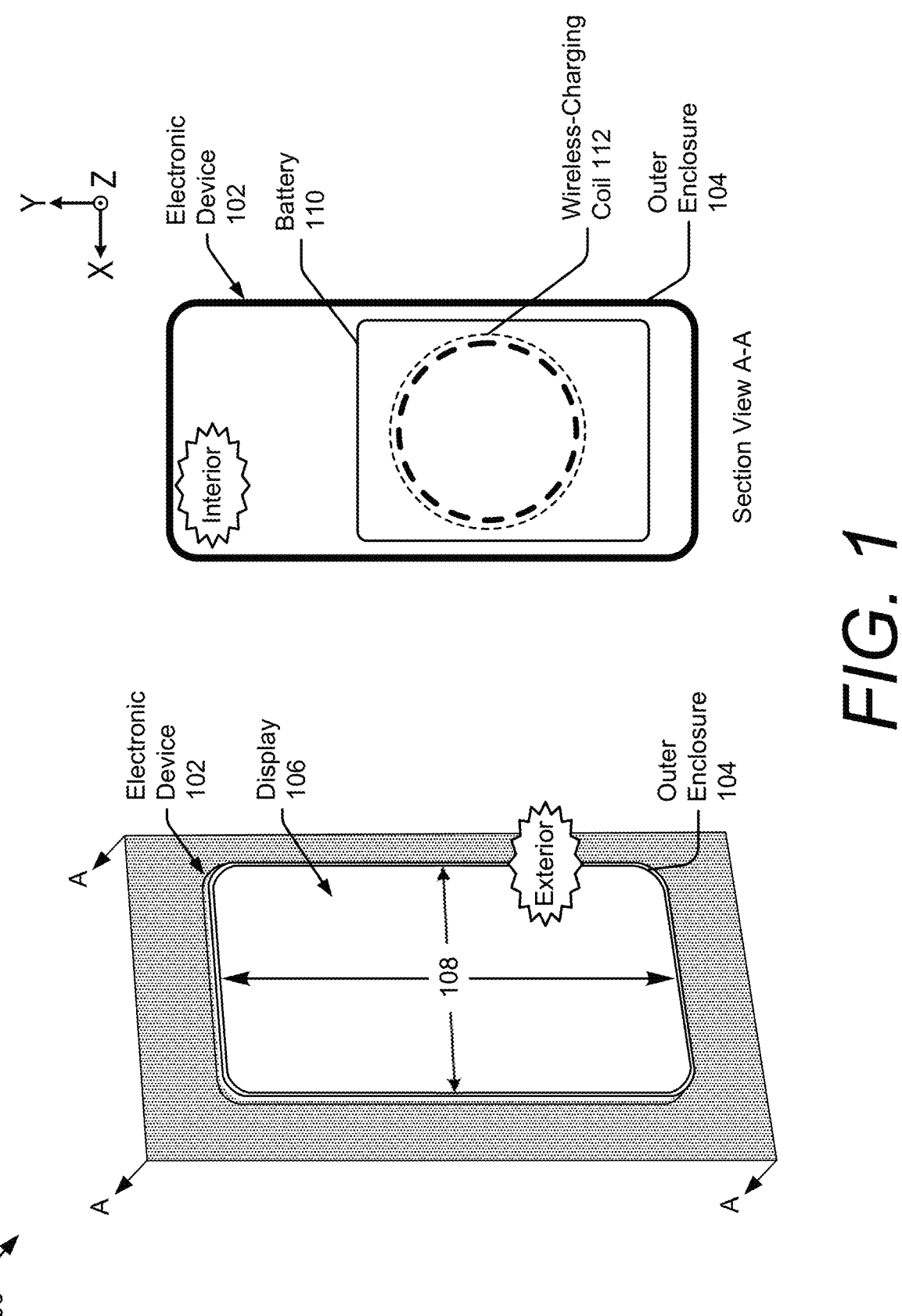
FIG. 1 illustrates an example implementation of an example electronic device having an outer enclosure and a display.

Portable electronic devices, including smartphones and laptops, have experienced consistently high consumer demand for the past decade. Billions of units of smartphones are manufactured and sold in a single year alone. The conveniences and services these portable electronic devices offer are now almost considered necessities in modern life. For example, navigation applications, telecommunication systems, and transactional services once were considered luxuries in the late 20$^{th}$ century but are now indispensable in the 21$^{st}$ century.

To promote portable electronic devices' integration into the everyday lives of users, manufacturers design these devices to withstand environmental stresses, including ingress contaminants, external mechanical forces, and software-based attacks. Further to this end, manufacturers continue to pursue sleeker, more-aesthetic designs that also support increased battery capacities, minimized manufacturing costs, and improved repairability. Device designs that achieve reduced material usage and lower manufacturing time that also allow for increased battery capacity and simplified repairability save manufacturers and consumers large sums of capital and elevate user experience.

For example, most smartphone designs include a rechargeable battery that is adhered to a structural component of the device, such as a frame or a housing panel. Thus, when a user seeks to replace a rechargeable battery and/or access an altogether separate internal electronic component (e.g., for repair, for replacement) that is physically inaccessible without first removing the rechargeable battery, the user may need to sever an adhesion between the rechargeable battery and the structural component. Aside from such a task being challenging and time consuming, severing this adhesion may require mechanical forces that can potentially damage components in the device. Moreover, designs that rely on adhering a rechargeable battery are challenging to manufacture and assemble. Adhering paste needs to be dispensed at precise locations and with repeatable quantities, slowing manufacturing and increasing costs.

To this end, this document describes systems and techniques directed at a battery chassis for electronic devices. In aspects, a battery is attached to a battery chassis that mechanically interlocks with a mechanical frame of an electronic device. The battery chassis includes a plurality of shear stops that constrain a motion of the battery chassis and battery subassembly in at least two dimensions. The battery chassis and battery subassembly can be removed from the electronic device without severing an adhesive, thus facilitating device repair.

The following discussion describes operating environments and techniques that may be employed in the operating environments and example methods. Although systems and techniques directed at a battery chassis for electronic devices are described, it is to be understood that the subject of the appended Claims is not necessarily limited to the specific features or methods described. Rather, the specific features and methods are disclosed as example implementations and reference is made to the operating environment by way of example only.

Example Environment

FIG. 1 illustrates an example implementation 100 of an example electronic device 102 (e.g., a smartphone) having an outer enclosure 104 (e.g., a housing) and a display 106. The display 106 may be implemented as a display panel stack having a cover layer and a display panel module. In at least some implementations, an opaque border is added to an underside of the cover layer, defining an active area 108. Alternatively, as illustrated in FIG. 1, the outer enclosure 104, surrounding the display 106, defines the active area 108. Further illustrated, in section view A-A, the electronic device 102 houses a battery 110 (e.g., a rechargeable battery) and a wireless-charging coil 112 within an internal cavity.

Figure 2:
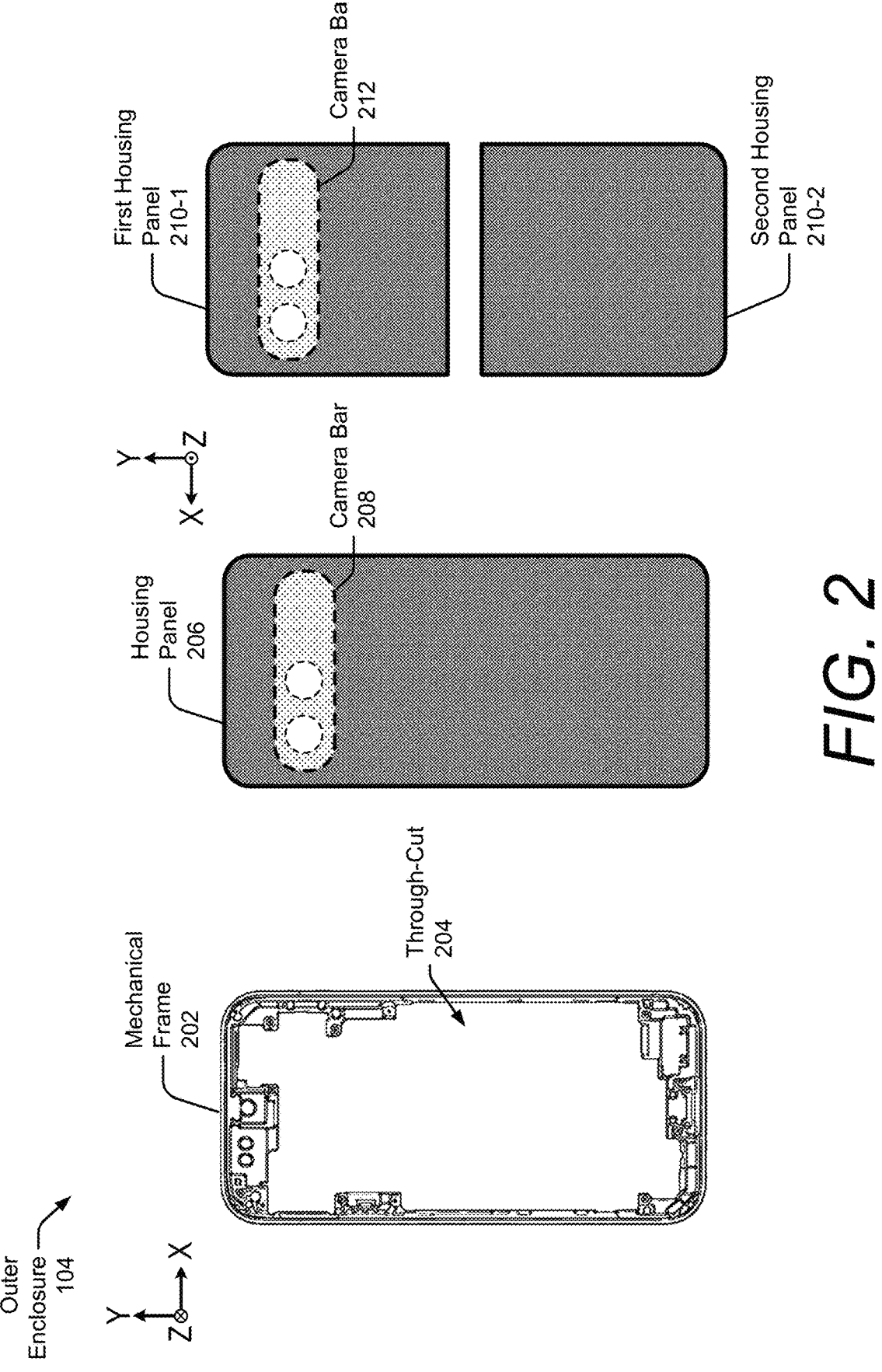
FIG. 2 illustrates the outer enclosure including a mechanical frame and one or more housing panels, which may be attached to the mechanical frame.

As illustrated in FIG. 2, the outer enclosure 104 may include a mechanical frame 202, such as an aluminum or plastic body, and one or more housing panels, which may be attached to (e.g., adhered to, fastened to) the mechanical frame 202. In implementations, the mechanical frame 202 is manufactured (e.g., stamped, machined) with a through-cut 204 that is sized greater than or equal to a cross-sectional area of the battery 110. Whereas some device designs utilize a mechanical frame with little-to-no through-cuts or through-cuts with areas smaller than a total area of a remaining mechanical frame, the mechanical frame 202 includes a large through-cut 204, utilizing less starting extrusion material (e.g., aluminum) and reducing manufacturing costs and device weight. In addition, the mechanical frame 202 with the large through-cut 204 may not contribute to a thickness (e.g., in a Z-axis) for significant portions of the electronic device 102. Most mechanical frames with smaller through-cuts contribute as much as two millimeters to a thickness (e.g., in a Z-axis) of an electronic device. As explained in greater detail below, a battery chassis enables the mechanical frame 202 to have such a large through-cut 204.

Further illustrated, the outer enclosure 104 includes one or more housing panels, such as housing panel 206 or a first housing panel 210-1 and a second housing panel 210-2. The one or more housing panels may be metal, plastic, glass, or a composite and may include two or more layers of these materials stacked together. For example, a first layer of the housing panel 206 may be composed of aluminum and a second layer of the housing panel 206 may be composed of glass. The aluminum and glass may include a through-cut for an elevated camera bar 208. In another example, the first housing panel 210-1 and the second housing panel 210-2 include a single layer composed of aluminum. The first housing panel 210-1 includes a through-cut for an elevated camera bar 212. In either implementation, the one or more housing panels can be attached to the mechanical frame 202 on at least one side of the mechanical frame 202 (e.g., a frontside, a backside). For example, the one or more housing panels include a back panel attached to the mechanical frame 202 opposite the display 106 (not illustrated in FIG. 2). The mechanical frame 202, the one or more housing panels, and the display 106, when attached together, form an internal cavity that can house one or more electronic components.

Figure 3:
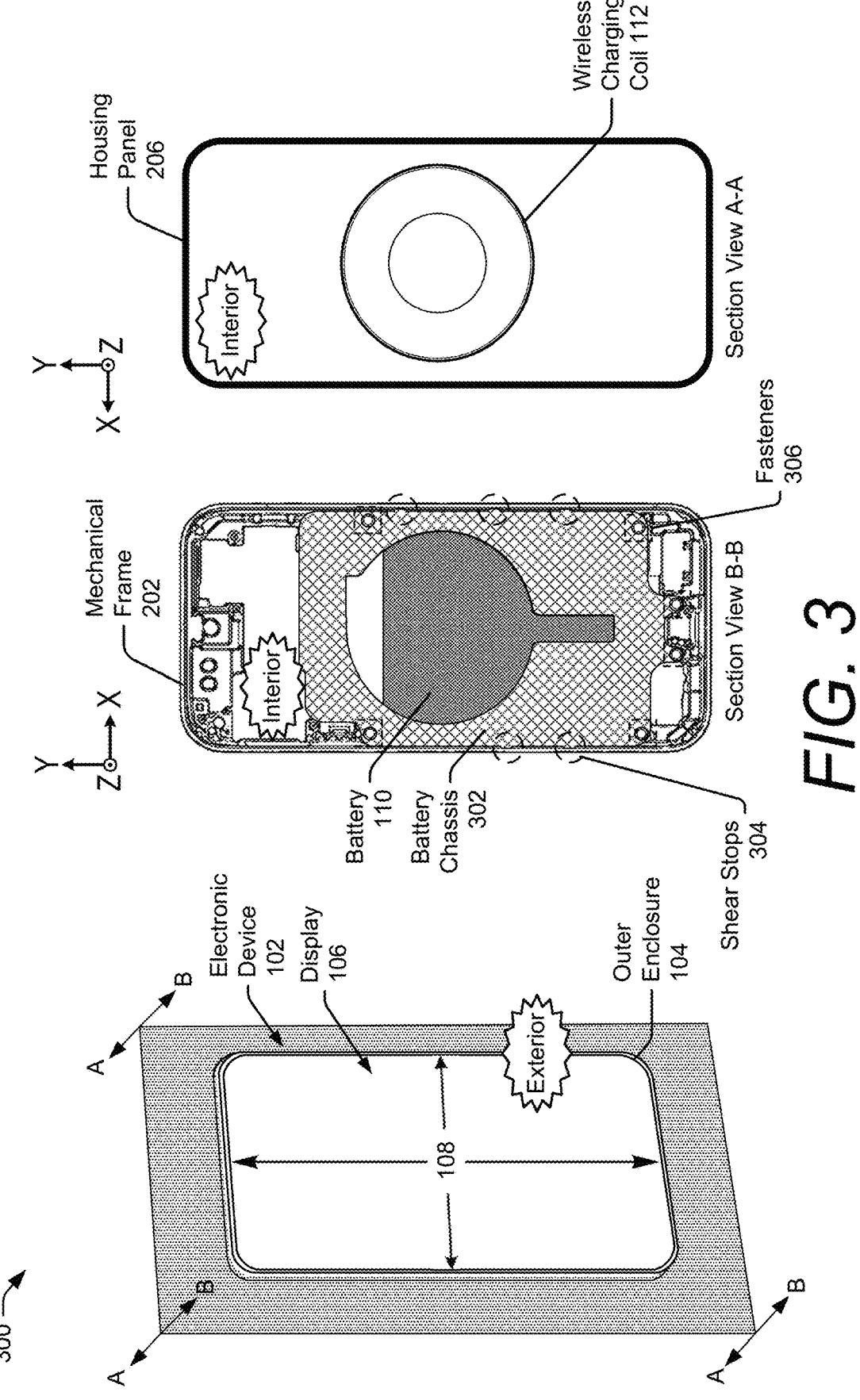
FIG. 3 illustrates an example implementation of the example electronic device having a battery chassis.

FIG. 3 illustrates an example implementation 300 of the example electronic device 102 having a battery chassis 302. The electronic device 102 may include additional components and interfaces omitted from FIG. 3 for the sake of clarity. As illustrated in section view B-B, because the through-cut 204 (not labeled) is sized greater than or equal to the battery 110, a battery chassis 302 and the battery 110, which is attached to the battery chassis 302, can fit into the electronic device 102 (e.g., from a backside of the electronic device 102 opposite the display 106) as a subassembly without adhesion. Further, the battery chassis 302 includes a plurality of shear stops 304 that fit into and interlock with the mechanical frame 202.

Figure 4:
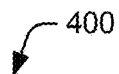
FIG. 4 illustrates a battery attached to the battery chassis.
Figure 4:
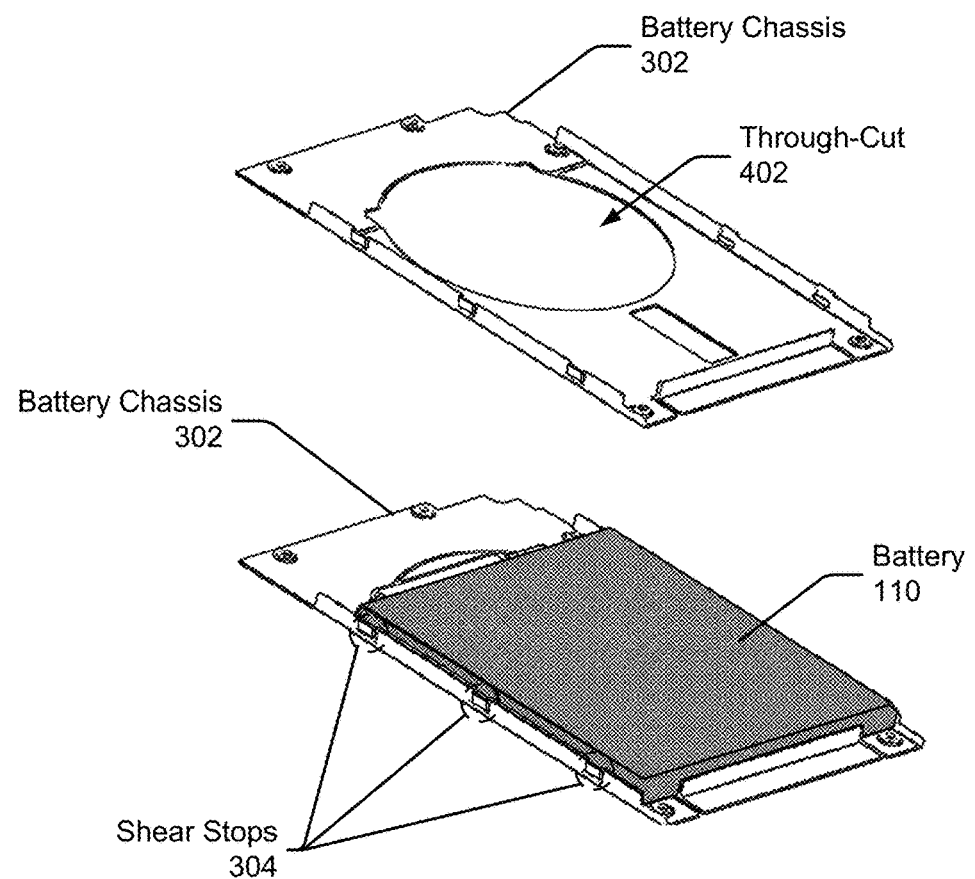

Referring to FIG. 4, momentarily, the battery chassis 302 may be a manufactured (e.g., stamped, machined) metallic carrier. In some implementations, the battery chassis 302 is a half-hardened stainless-steel carrier that is 0.25 millimeters thick and is selected based on its yield strength. As illustrated in FIG. 4, the battery 110 may be attached to the battery chassis 302, for example, via a pressure sensitive adhesive. In this way, the battery chassis 302 and battery 110 subassembly may be removed from the electronic device 102 without severing an adhesion. The battery 110 may then be removed from the battery chassis 302, minimizing the risk of damage to other components in the electronic device 102 during removal. Further, because the battery chassis 302 may partially surround the battery 110 (e.g., for at least portions on at least four sides of the battery), less adhesive can be applied to mechanically secure the battery 110.

Based on the material selection (e.g., the alloy) of the battery chassis 302 and the partial enclosure of the battery 110 by the battery chassis 302, the battery chassis 302 may also act as a conductive heat spreader. Through such a design, the battery chassis 302 can transfer heat generated by the battery 110 (or associated electrical components) to the mechanical frame 202. In comparison to a design that mounts a battery to a housing panel of the electronic device via an adhesive, heat my be more-uniformly distributed in, for example, an aluminum mechanical frame 202 than a plastic or glass housing panel 206.

Referring back to FIG. 3, in implementations, the plurality of shear stops 304 constrain a movement of the battery chassis 302 (and battery 110) in at least two dimensions. For example, the shear stops 304 constrain a movement of the battery chassis 302 in a Y-axis and a Z-axis (e.g., when the housing panel 206 is attached to the mechanical frame 202). The plurality of shear stops 304 may be forged into/onto the battery chassis 302 via stamping, machining, or welding. A number of the plurality of shear stops 304 may be selected based on a design of the electronic device 102, such as a location of volume controls and/or dimensions of the electronic device 102. For example, FIG. 3 illustrates five shear stops 304: two on a first side of the electronic device 102 and three on a second side opposite of the first side. Further, a number of shear stops may be selected based on a bonding strength of an adhesive (e.g., a liquid-dispensed adhesive, a pressure-sensitive adhesive) for a given surface area between the mechanical frame 202 and the housing panel 206.

In at least some implementations, the battery chassis 302 is attached to the mechanical frame 202 via one or more fasteners 306 (e.g., screws, snap-fit fasteners). Tolerances between receiving holes of the mechanical frame 202 and the one or more fasteners 306 may be larger than tolerances between the plurality of shear stops 304 of the battery chassis 302 and the mechanical frame 202. In this way, mechanical forces (e.g., compressive forces) can be distributed to the plurality of shear stops 304 before being distributed to the one or more fasteners 306 (e.g., in the Y-axis, in the Z-axis). In alternative implementations, the mechanical forces can be distributed between the plurality of shear stops 304 and the one or more fasteners 306.

As an example, if the electronic device 102 experiences a change in acceleration from a first acceleration to a second acceleration, such as when a falling electronic device 102 comes into contact with a hard surface, compressive forces may travel through the electronic device 102 and subassemblies, such as the battery chassis 302 and the battery 110, may experience inertial loading (e.g., forces and moments that result from an acceleration or deceleration of a mass). Due to the tighter tolerances between the plurality of shear stops 304 and the mechanical frame 202 than between the one or more fasteners 306 and the receiving holes, these internal mechanical forces caused by compression and/or inertial loading may be experienced at and distributed between the plurality of shear stops 304. In this way, a large portion of the mechanical load can be distributed into the plurality of shear stops 304, which can absorb the load (e.g., elastic deformation) without plastic deformation. In comparison to a design that mounts a battery to a structural component of an electronic device via an adhesive, the battery chassis 302 with the plurality of shear stops 304 reduces a battery inertial loading and minimizes a potential dislodgement of the battery 110 and/or damage to the battery 110.

Further illustrated in FIG. 3, the wireless-charging coil 112 may be disposed between the battery 110 and the housing panel 206. In at least some implementations, the housing panel includes a circularly-shaped recess in which at least portions of the wireless-charging coil 112 are nested. Referring again to FIG. 4, the battery chassis 302 may include a circularly-shaped through-cut 402 that also nests at least other portions of the wireless-charging coil 112 (not illustrated in FIG. 4).

Figure 5:
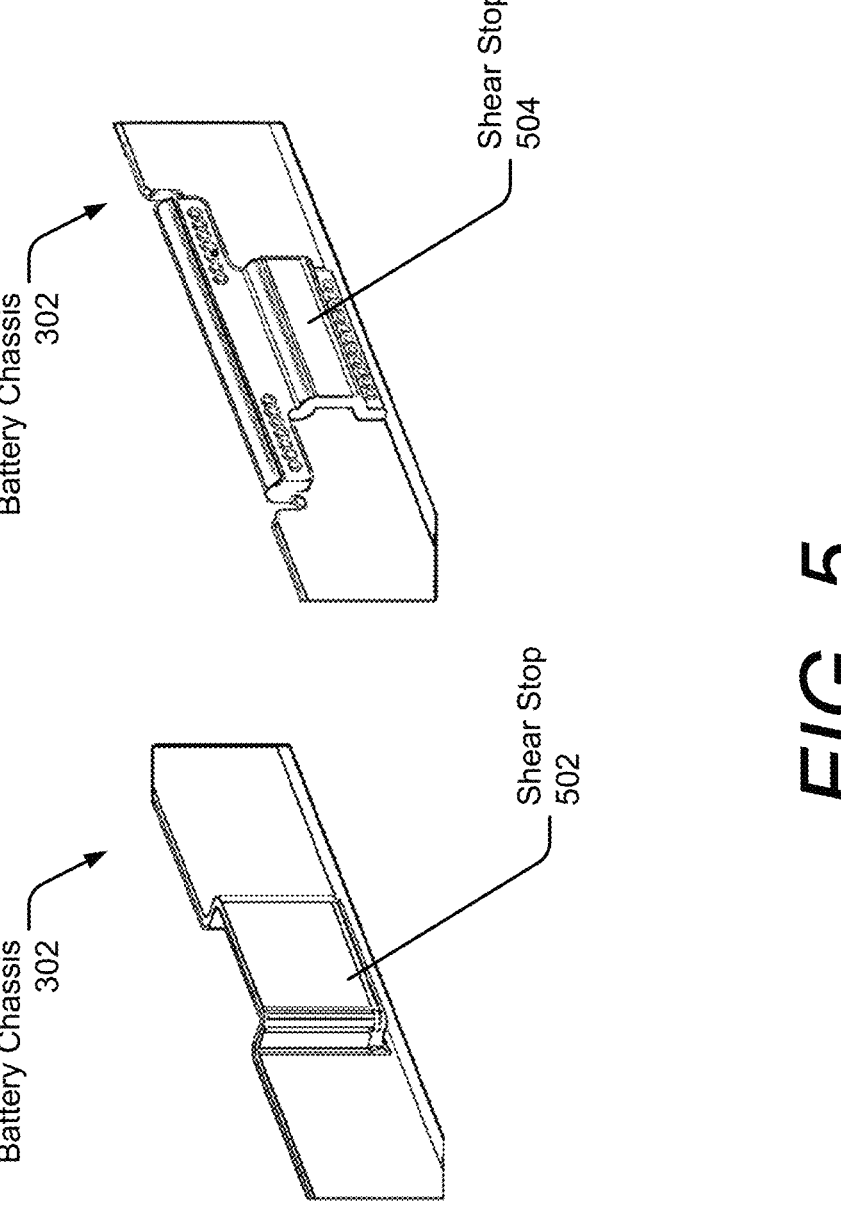
FIG. 5 illustrates example implementations of example shear stops.
Figure 5:

FIG. 5 illustrates example implementations 500 of example shear stops (e.g., a first shear stop 502, a second shear stop 504). As illustrated, the first shear stop 502 possesses a half-bucket geometry and extends out from a side wall of the battery chassis 302. The first shear stop 502 may protrude 0.85 millimeters out from a side wall of the battery chassis 302 and may be 2.5 to 3 millimeters tall, for example. The battery chassis 302 may include a plurality of shear stops formed similar to the first shear stop 502.

Further illustrated, the second shear stop 504 includes an attached (e.g., welded) component. The second shear stop 504 may protrude 0.5 to 0.9 millimeters out from a side wall of the battery chassis 302. The battery chassis 302 may include a plurality of shear stops formed similar to the first shear stop 502 and/or the second shear stop 504. The first shear stop 502 and the second shear stop 504 may be manufactured into the battery chassis 302 via one or more of stamping, welding, machining, or the like.

Figure 6:
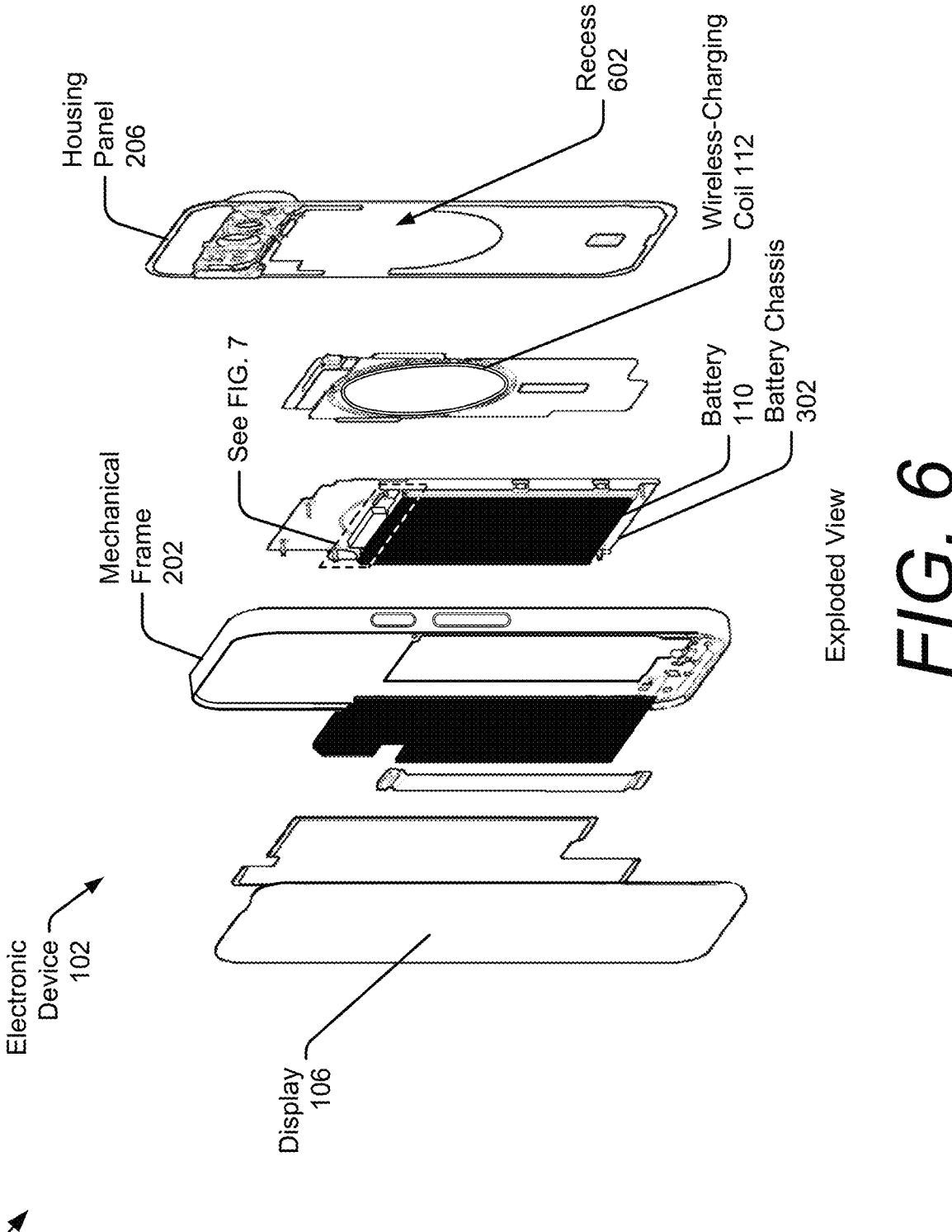
FIG. 6 illustrates an exploded view of an example implementation of the example electronic device.

FIG. 6 illustrates an exploded view of an example implementation 600 of the electronic device 102. As illustrated, the housing panel 206 is positioned on a first side of the mechanical frame 202 opposite a second side where the display 106 is positioned. In some implementations, the housing panel 206 includes a recess 602 (e.g., a circularly-shaped recess) into which at least portions of the wireless-charging coil 112 are nested. By nesting the wireless-charging coil 112 in the battery chassis 302 and the housing panel 206, a volumetric efficiency inside the electronic device 102 is maximized, enabling a thickness of the electronic device 102 to be reduced and/or a battery capacity of the battery 110 to be enlarged.

Figure 7:
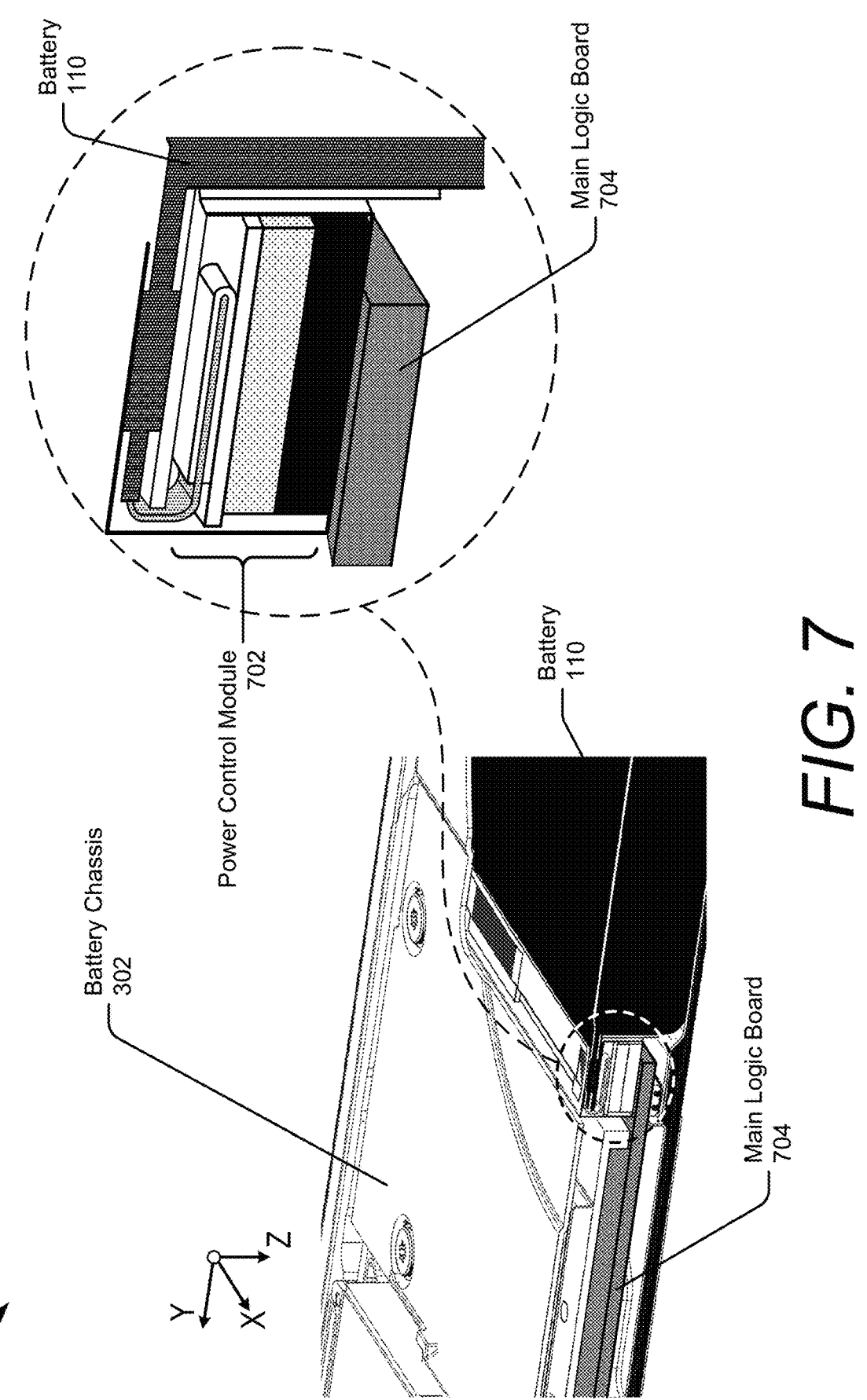
FIG. 7 illustrates a positioning of a power control module, operatively coupled to the battery, relative to a main logic board.

Further, as illustrated in FIG. 7, because the battery 110 is not adhered to a structural component (e.g., a housing panel)

of the electronic device 102, a power control module 702, operatively coupled to the battery 110, may be positioned between a main logic board 704 and at least one of battery 110, the battery chassis 302, or the housing panel 206. In this way, the battery chassis 302 and battery 110 subassembly optimizes an internal volume of the electronic device 102 (e.g., by stacking components along a thickness of the device (Z-axis)), enabling a larger battery capacity (e.g., along a length of the device (Y-axis)). Moreover, in conventional designs, without the battery chassis 302 and battery 110 subassembly, electronic devices often require a power control module to be de-bonded from a given structural component anytime a main logic board needs to be removed, making device repair more challenging and time consuming. With a device design that utilizes a battery chassis 302 and battery 110 subassembly, the power control module 702 does not have to be de-bonded when the main logic board 704 is removed. Additionally, by positioning the power control module 702 adjacent to the main logic board 704 (e.g., in the Z-axis), the electronic device 102 can support a direct connection of the battery 110 to the main logic board 704 using, for example, spring contacts, rather than a flex with board-to-board connection. Such a design lowers cost and electrical resistances while simultaneously improving repairability by eliminating the need to remove and reconnect a battery flex.

Figure 8:
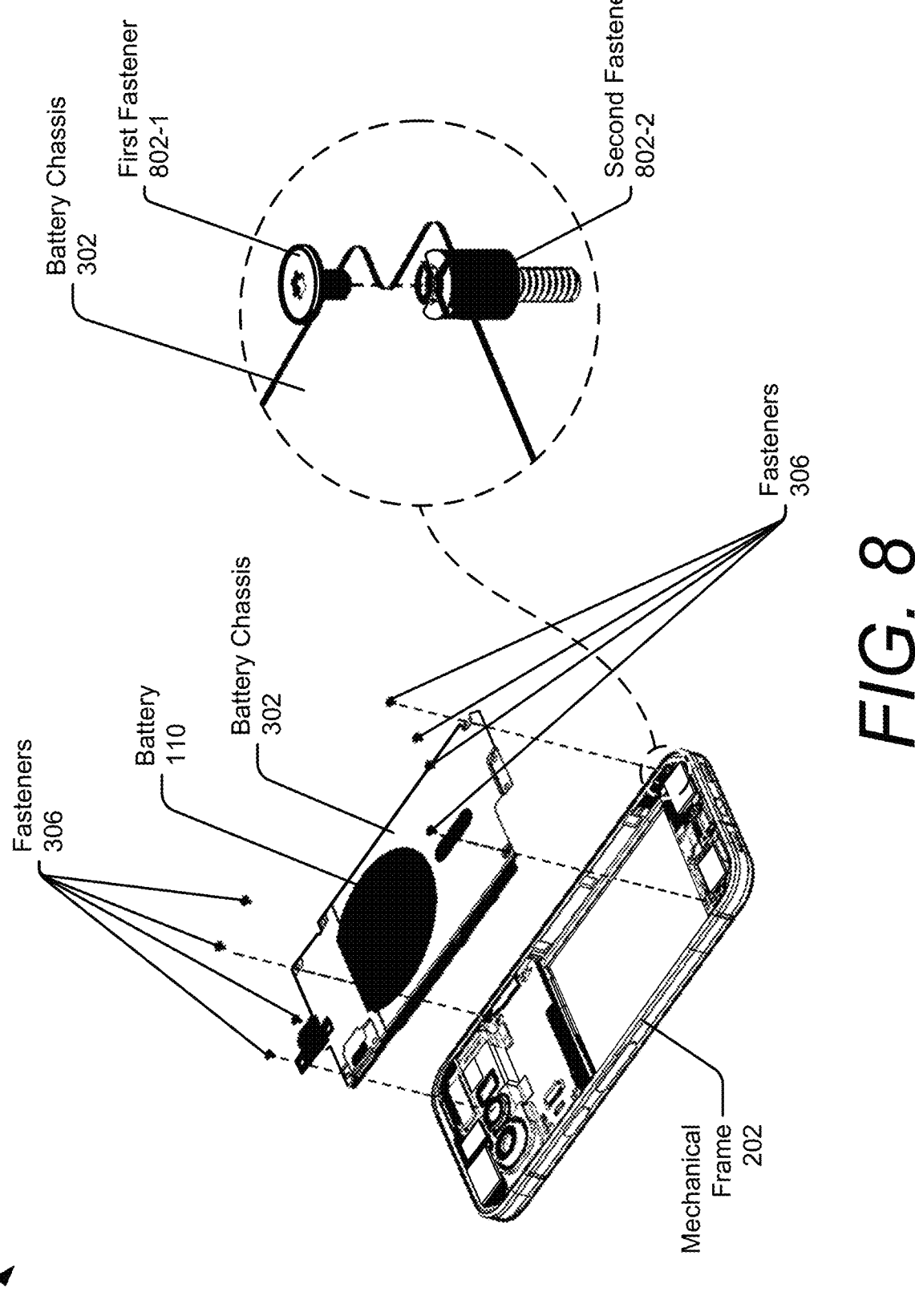
FIG. 8 illustrates an example implementation of the battery chassis being attached to the mechanical frame via one or more fasteners.

FIG. 8 illustrates an example implementation 800 of the battery chassis 302 being attached to the mechanical frame 202 via one or more fasteners 306. As illustrated, the example implementations 800 includes a dual screw architecture having a first fastener 802-1 and a second fastener 802-2. For example, the second fastener 802-2 screws into mechanical frame 202 (or other components secured to the mechanical frame 202) and secures one or more components, including logic boards. The first fastener 802-1 screws into a portion of the second fastener 802-2 (e.g., an opening, a receiving hole), securing the battery chassis 302 through the second fastener 802-2 to the mechanical frame 202. Such a design reduces an amount of space required to attach the battery chassis 302 to the mechanical frame 202 (e.g., through the second fastener 802-2) and enables the one or more components (e.g., logic boards) to remain attached within the electronic device 102 when the battery chassis 302 is removed.

Figure 9:
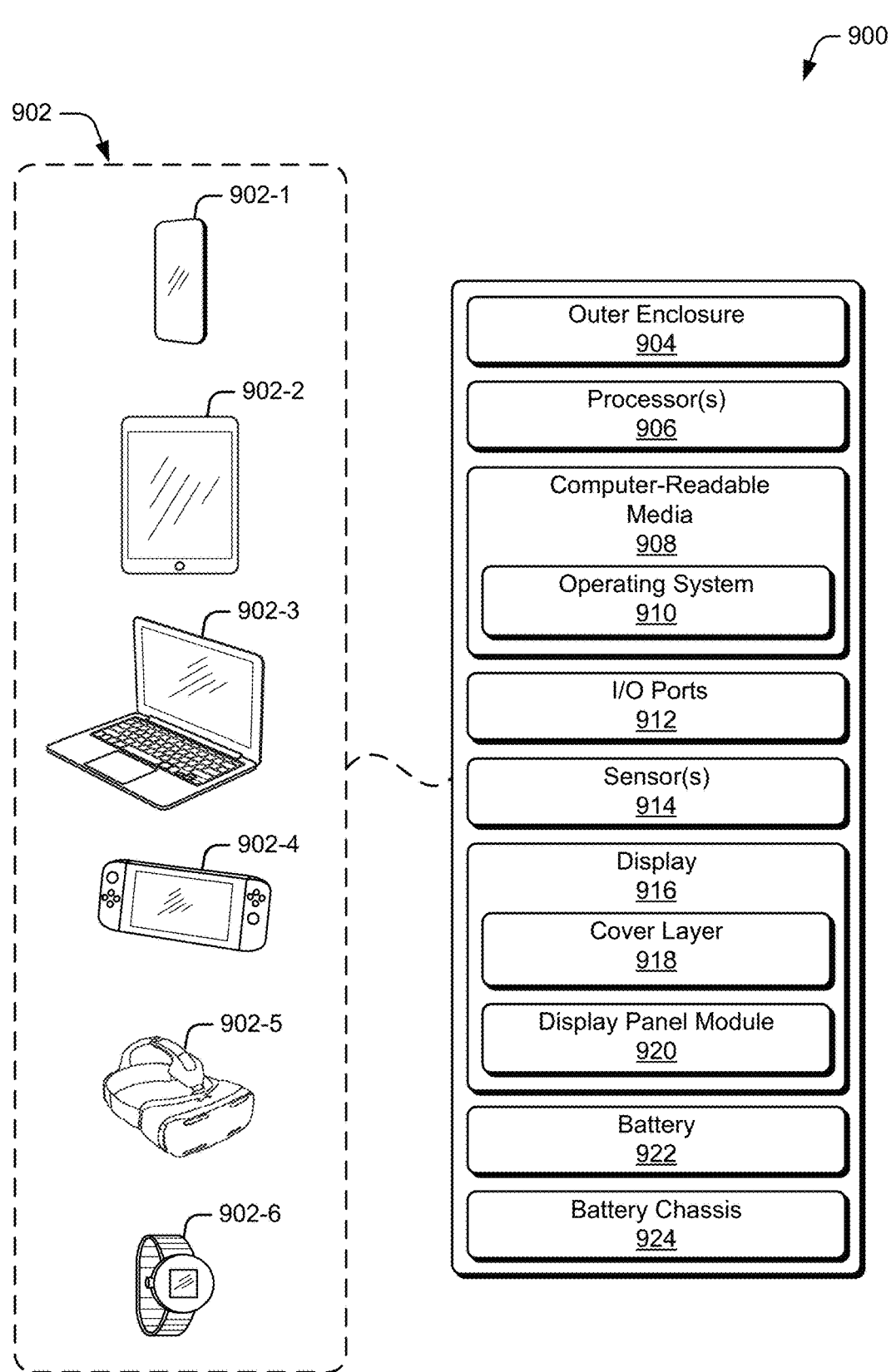
FIG. 9 illustrates an example device diagram of example electronic devices in which a battery chassis can be implemented.

FIG. 9 illustrates an example device diagram 900 of example electronic devices 902 in which a battery chassis (e.g., battery chassis 302) can be implemented. The electronic device 902 may include additional components and interfaces omitted from FIG. 8 for the sake of clarity. The electronic device 902 can be any of a variety of consumer electronic devices. As non-limiting examples, the electronic device 902 can be a mobile phone 902-1, a tablet device 902-2, a laptop computer 902-3, a portable video game console 902-4, virtual-reality (VR) goggles 902-5, a computerized watch 902-6, and the like.

The electronic device 902 includes an outer enclosure 904. The outer enclosure 904 includes a mechanical frame (e.g., mechanical frame 202) and one or more housing panels (e.g., housing panel 206). As an example, a mechanical frame may support portions of the one or more housing panels. As an example, one or more exterior housing components (e.g., plastic panels) can be attached to the mechanical frame. In so doing, the mechanical frame physically supports the one or more exterior housing components, which define portions of the outer enclosure 904. In implementations, the mechanical frame and/or the exterior housing components may be composed of crystalline or noncrystalline (e.g., metals, plastics) inorganic solids. The mechanical frame can be designed in a variety of configurations. In implementations, the mechanical frame may be designed with a hoop architecture. As an example, a mechanical frame designed with a hoop architecture defines a rectangular polyhedron with a through-cut.

The electronic device 902 may further include one or more processors 906. The processor(s) 906 can include, as non-limiting examples, a system on a chip (SoC), an application processor (AP), a central processing unit (CPU), or a graphics processing unit (GPU). The processor(s) 906 generally executes commands and processes utilized by the electronic device 902 and an operating system 910 installed thereon. For example, the processor(s) 906 may perform operations to display graphics of the electronic device 902 on a display and can perform other specific computational tasks.

The electronic device 902 may also include computer-readable storage media (CRM) 908. The CRM 908 may be a suitable storage device configured to store device data of the electronic device 902, user data, and multimedia data. The CRM 908 may store an operating system that generally manages hardware and software resources (e.g., the applications) of the electronic device 902 and provides common services for applications stored on the CRM 908. The operating system and the applications are generally executable by the processor(s) 906 to enable communications and user interaction with the electronic device 902. One or more processor(s) 906, such as a GPU, perform operations to display graphics of the electronic device 902 on a display and can perform other specific computational tasks. The processor(s) 906 can be single-core or multiple-core processors.

The electronic device 902 may also include input/output (I/O) ports 912. The I/O ports 912 allow the electronic device 902 to interact with other devices or users. The I/O ports 912 may include any combination of internal or external ports, such as universal serial bus (USB) ports, audio ports, Serial ATA (SATA) ports, PCI-express based ports or card-slots, secure digital input/output (SDIO) slots, and/or other legacy ports.

The electronic device 902 may further include one or more sensors 914. The sensor(s) 914 can include any of a variety of sensors, such as an audio sensor (e.g., a microphone), a touch-input sensor (e.g., a touchscreen), an image-capture device (e.g., a camera, video-camera), proximity sensors (e.g., capacitive sensors), an under-display fingerprint sensor, or an ambient light sensor (e.g., photodetector). In implementations, the electronic device 902 includes one or more of a front-facing sensor(s) and a rear-facing sensor(s).

Further, the electronic device 902 may include a display 916 (e.g., a display panel stack) having a cover layer 918 and a display panel module 920. The cover layer 918 may be composed of any of a variety of transparent materials including polymers (e.g., plastic, acrylic), glass (e.g., tempered glass), and so forth, forming any three-dimensional shape. For example, the display panel stack 206 may be implemented as a plastic OLED (POLED) or as a glass OLED (GOLED). During manufacturing, a bottom face of the cover layer 918 may be bonded (e.g., glued) to the display panel module 920 to protect the display panel module 920 as well as to serve as a barrier to ingress contaminants (e.g., dust, water). The outer enclosure 904 and the display 916 may define at least one internal cavity within which one or more of a plurality of electronic components may be disposed. In alternative implementations, the outer enclosure 904 defines at least one internal cavity.

The display panel module 920 may include a two-dimensional pixel array forming a grid, operably coupled to one or more row-line drivers via electrical traces. The pixel array generates light to create an image on the display 916 upon electrical activation by one or more drivers. As an example, data-line drivers provide voltage data via electrical traces to the pixel array to control a luminance of individual pixels.

The electronic device 902 further includes a battery 922 and a battery chassis 924. In implementations, the battery 922 is a rechargeable battery that is configured to store and supply electrical energy. The battery 922 may be any suitable rechargeable battery, such as a lithium-ion (Li-ion) battery. Various different Li-ion-battery chemistries may be implemented, some examples of which include lithium cobalt oxide (LiCoO2), lithium iron phosphate (LiFePO4), lithium manganese oxide (LiMn2O4 spinel, or Li2MnO3-based lithium-rich layered materials, LMR-NMC), and lithium nickel manganese cobalt oxide (LiNiMnCoO2, Li-NMC, LNMC, NMC, or NCM and the various ranges of Co stoichiometry). Also, Li-ion batteries may include various different anode materials, including graphite-based anodes, silicon (Si), graphene, and other cation intercalation/insertion/alloying anode materials. The battery 922 further includes battery terminals (not illustrated) for connection to a load and a power source.

CONCLUSION

Unless context dictates otherwise, use herein of the word "or" may be considered use of an "inclusive or," or a term that permits inclusion or application of one or more items that are linked by the word "or". Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying Drawings and terms discussed herein may be indicative of one or more items or terms, and thus reference may be made interchangeably to single or plural forms of the items and terms in this written description.

Although implementations directed at a battery chassis for electronic devices have been described in language specific to certain features and/or methods, the subject of the appended Claims is not necessarily limited to the specific features or methods described. Rather, the specific features and methods are disclosed as example implementations directed at a battery chassis for electronic devices.

What is claimed is:

1. An electronic device comprising:
   an outer enclosure including a mechanical frame and one or more housing panels;
   a display attached to the outer enclosure, the outer enclosure and the display configured to define an internal cavity;
   a battery disposed within the internal cavity; and
   a battery chassis on which the battery is attached, the battery chassis comprising a plurality of shear stops that mechanically interlock with the mechanical frame, the plurality of shear stops configured to constrain a movement of the battery chassis in at least two dimensions.

2. The electronic device of claim 1, further comprising:

a wireless-charging coil disposed between the battery and the outer enclosure.

3. The electronic device of claim 2, wherein the one or more housing panels comprise a back panel, the back panel attached to a first side of the mechanical frame opposite the display attached to a second side of the mechanical frame, and wherein the back panel comprises a circularly-shaped recess in which at least portions of the wireless-charging coil are nested.

4. The electronic device of claim 3, wherein the battery chassis comprises a circularly-shaped through-cut in which at least other portions of the wireless-charging coil are nested.

5. The electronic device of claim 1, further comprising:

one or more fasteners that connect the battery chassis to the mechanical frame via one or more receiving holes.

6. The electronic device of claim 5, wherein the one or more fasteners and the one or more receiving holes having a first set of tolerances greater than or equal to a second set of tolerances between the shear stops and the mechanical frame.

7. The electronic device of claim 5, wherein the one or more fasteners that connect the battery chassis to the mechanical frame are a first plurality of fasteners, and wherein the one or more receiving holes comprise openings in a second plurality of fasteners.

8. The electronic device of claim 7, wherein the second plurality of fasteners are configured to secure one or more logic boards in the electronic device.

9. The electronic device of claim 1, wherein compressive forces caused by a first acceleration of the outer enclosure that differs from a second acceleration of the battery chassis are distributed between the plurality of shear stops, and wherein the plurality of shear stops are configured to reduce an inertial loading of the battery.

10. The electronic device of claim 1, wherein the battery chassis is configured to thermally-spread heat generated by the battery.

11. The electronic device of claim 1, wherein the battery is adhered to the battery chassis, and wherein the battery chassis is configured to be removed from the electronic device.

12. The electronic device of claim 1, wherein the battery chassis at least partially surrounds the battery.

13. The electronic device of claim 1, wherein the mechanical frame comprises a through-cut that is sized greater than or equal to a cross-sectional area of the battery.

\* \* \* \* \*